Aug. 26, 1952 — J. L. BREARTON — 2,608,357
FILM LOADING GUIDE
Filed June 8, 1949
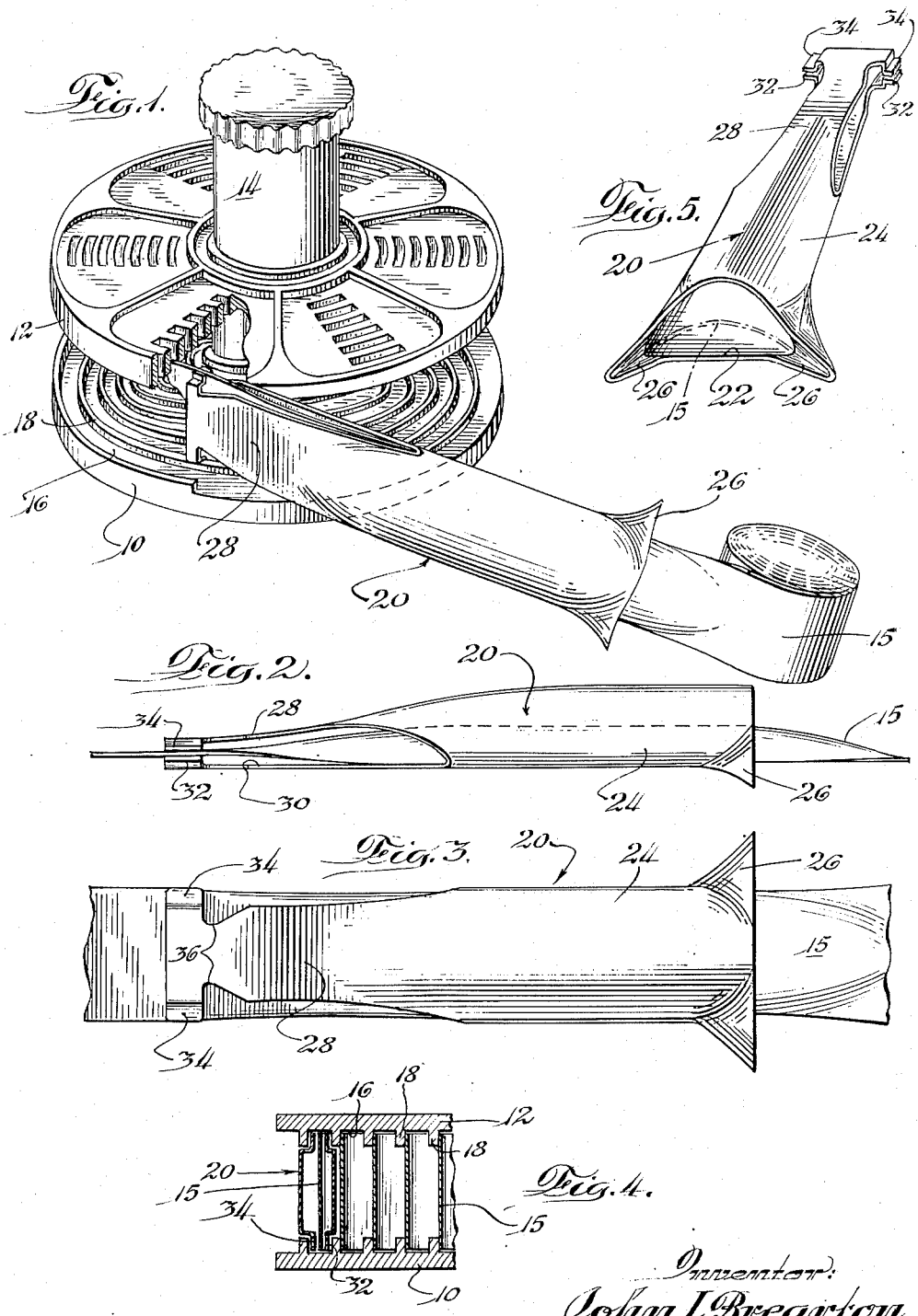

Patented Aug. 26, 1952

2,608,357

UNITED STATES PATENT OFFICE 2,608,357

FILM LOADING GUIDE

John L. Brearton, Savanna, Ill.

Application June 8, 1949, Serial No. 97,897

5 Claims. (Cl. 242—76)

The present invention relates to a film loading guide.

35 mm. motion picture film as used by any of several still cameras, generally classified as miniatures, is usually processed in lengths of something over five feet. To be developed, the film is inserted into a spool especially provided for the purpose which has an arrangement for spacing the turns of the film upon the spool to provide space between the turns for the action of the processing solutions. One difficulty attending such processing method and arrangement is that the film must be loaded upon the spool in complete darkness. The processor loading the spool, therefore, has only the sense of touch to guide him during this operation. Because of this, it usually takes the development of considerable facility obtained only with experience to load such a spool in a reasonable length of time without the ever present danger of touching the emulsion side of the film, which should always be protected against any such contact. Even with considerable experience this operation still is rather painstaking and because normally the user of such processing methods may not load a spool for extended periods, what facility is acquired at one loading may be largely lost between successive loadings.

It is therefore one of the objects of the present invention to provide a novel device which is intended to be used with a film processing tank of comparatively standard construction for facilitating the placing of film upon the processing spool.

Another object is to provide such a device at low cost.

Still another object is to provide such a film loading guide which may be used with spools now widely in use with only slight modification of such spools.

Other objects and advantages will become apparent from the following description of a preferred embodiment of my invention which is illustrated in the accompanying drawings, in which:

Fig. 1 is a perspective view of a film developing spool with a portion thereof broken away and showing the device of the present invention in use therewith;

Fig. 2 is a side view of the film loading device comprising the present invention with a length of film inserted therein;

Fig. 3 is a top view of the device;

Fig. 4 may be considered as a partial vertical sectional view taken in a radial plane along the line 4—4 of Fig. 1 showing the device of the present invention in use; and Fig. 5 is a perspective view of the device as observed from above and to the rear thereof.

The spool shown in Fig. 1 may be considered as essentially conventional. Such a spool comprises a lower flange 10 and a similar upper flange 12 which are connected by an adjustable center post 14. Although the center post 14 in the present illustration is of the adjustable type so as to adapt the reel to handle photographic film of different width, such reels frequently are made to accommodate film of only one size. This variation, however, does not affect the use of the present invention.

The inner face of each of the circular flanges 10 and 12 is provided with a spiral groove 16 which extends from the periphery to the center post 14. Normally this groove will be approximately six feet long. As is best seen in Fig. 4 the groove is formed as the space between successive turns of a continuous spiral rib 18 which projects inwardly from the inner face of each of the flanges a matter of an eighth of an inch or so. Usually the flanges and the central post of such spools are formed of molded thermosetting plastic materials which are hard and not readily attacked by the processing chemicals used.

Usually such a spool is loaded by inserting the end of the film to be processed into the peripheral end of the grooves 16 and then pushing the film in an endwise direction so as to cause it to spiral inwardly in the groove 16 until the extreme end reaches the center post, at which time the outward end of the film should be well within the confines of the grooves. In order to aid the insertion of the end of the film, the outward ends of the ribs 18 frequently are provided with inwardly projecting extensions which form lips beneath which the end of the film is located. If such lips are provided upon a particular spool they should be removed before using the film guide forming the subject matter of the present invention. This may be done simply and quickly merely by using a flat file of almost any character.

When the film indicated by the numeral 15 has been pushed into the groove 16 the loaded spool is then placed in a tank with a cover having an opening therein through which chemicals may be poured to fill or empty the tank. This opening usually is provided with a light trap so that the tank may be filled and emptied in ordinary light.

One of the difficulties occasioned in the use of such a spool and with such film loading methods is that the film may push into the groove 16 for a distance of several feet and then bind so as to make the insertion of the remaining portion of the film extremely difficult and sometimes impossible. This is particularly true if the spool is slightly damp. Also the characteristic of the curl in the film has a considerable effect upon the facility with which the film may be loaded. Normally, perforated 35 mm. motion picture film (in the interest of simplicity, the film is not shown as perforated in the drawing since both perforated and imperforate film may be used as taken from a camera casette will have a tight curl which aids in loading the spool since the groove in the spool expands the curvature in the film so that the film is more straight. Because of this, the film has a tendency to try to feed itself into the groove, since it always is advancing toward the portion of the groove of smaller diameter. Some cameras, however, take up the film upon a spool which turns in a reverse direction, that is, with the emulsion side of the film outwardly. If film which has been exposed is left in such a camera for some length of time or, for instance, if the major portion of the film in the camera has been exposed for a few days and then the last few pictures upon the spool are taken and the film rewound back into the casette and immediately taken out for loading into the film tank, it will be found that the film will have very little curvature and may under some conditions be almost straight or even curled backwardly slightly. Under these conditions great difficulty is frequently encountered in loading a developing spool of the type shown in Fig. 1 in the conventional manner.

The loading device which forms the subject matter of the present invention may be made of light gauge sheet metal or of a plastic or similar material. It comprises a generally tubular section 20 which is shaped to provide a relatively flat bottom 22 integrally connected at its sides with an upper portion 24 which is generally oval in cross section. The internal width of this tube is slightly less than the width of the film 15 to be processed and for 35 mm. film may be approximately one and one-fourth inches wide, such film being approximately one and three-eighths inches wide. The shape of the tube is best shown in Fig. 5 where it will be seen that since the internal width of the tube is approximately an eighth inch narrower than the width of the film the portion of the film within the tube will be buckled transversely so as to have a convex upper surface and a concave lower surface. The oval shaped top of the tube is formed so as not to touch the top face of the film at any point.

To facilitate insertion of the end of the film into this tubular portion, the extreme end is flared to form a funnel shaped entrance 26. The tubular portion just described including the funnel like entrance is approximately two and one-half inches long and is integrally connected with a pair of outwardly extending upper and lower strips 28 and 30, respectively. The lower strip may be considered as an extension of the flat bottom surface 22 excepting that preferably it is somewhat narrower and is formed at its extreme end with a pair of outwardly diverging tabs 32. These tabs preferably are offset slightly upwardly above the bottom surface 22. The width between the extreme ends of these two tabs is approximately the same as the width of the film to be processed and the portions of these tabs which are upwardly offset are slightly less in width than the width of the perforations at the edge of the film to be processed or, in other words, slightly less in width than the unexposed side edges of the film.

The upper strip 28 is substantially the duplicate of the lower strip 30 excepting that although the tabs 34 which are disposed above the tabs 32 are spaced only slightly therefrom and are somewhat downwardly offset, the portion of the upper strip 28 which connects the tabs 34 with the tubular portion 24 slants upwardly toward the tubular portion so that it does not touch the upper surface of the film.

The device is used in the following manner. The end of a length of film 15 to be loaded is pushed into the funnel like opening 26 and is thus compressed transversely so as to have an upwardly bowed surface in transverse section. The film is pushed through the tube 20 and beyond so that the end of the film passes between the tabs 34 and 32. Although the portion of the film passing through the tubular section 20 is compressed transversely and therefore bowed, as soon as the edges of the film are released by passing beyond the end of this tubular portion the film spreads laterally and flattens out so that when it reaches the tabs 34 it is substantially flat. The length of the extensions 28 and 30, therefore, which connect the tabs 34 and 32 to the tubular portion 20 should be whatever is necessary to permit the film to expand laterally into a flat condition after passing beyond the tubular portion 20. There will also be a certain minimum dimension for this section which is determined by the diameter of the spool upon which the film is loaded, as will appear presently.

After the end of the film has been inserted into the loading device in the manner described so that the end of the film has just passed through between the tabs 34 and 32, the tabs are inserted into the peripheral ends of the spiral slots 16. The reel is then rotated so as to cause the spiral groove 16 to advance toward the tabs 34 and 32, thereby causing these tabs to follow a spirally inward path to the center of the spool. It usually requires about five to six revolutions of the spool to accomplish this.

By referring to Fig. 1 it will be seen that as the tabs spiral inwardly toward the spool center the main portion of the device of the present invention extends outwardly approximately tangentially to the groove. The length of the extensions 28 and 30 should therefore be at least equal to the distance between the periphery of the spool and the inner end of the groove in a direction tangential to the groove. The inward edges of the ribs 18 prevent the edgewise compressed film from expanding and in fact the space between these ribs is approximately the same as the internal dimension across the tubular portion 24.

When the tabs 34 and 32 have reached the inner end of the spiral grooves, the film is pushed slightly into the tubular portion 24 so that a small amount of film projects beyond the tabs 34 and 32 where it can be grasped and held against retraction by one of the processor's fingers. If desired, this short section of film can be projected beyond the tabs 34 and 32 before these tabs are started into the groove. In either event, the short projecting section of film is held while the reel is rotated backwardly for a turn to cause the tabs 32 and 34 to back out of the groove while laying the film strip in place. After a revolution or so of the spool the film will have sufficient braking action against the edges of ribs 18 so that the reel may be rotated to back out the tabs 34 and 32 while the film continuously passes into the grooves 16. In other words, the film does not follow the tool as the tool is backed out of the grooves 16 after the first revolution or so. As the reel is spun in a rearwardly direction the film flows evenly into the slots 16 until the end of the film is reached, after which continued rotation of the reel in the same direction causes the tool to reach the peripheral ends of the slots 16. The loaded reel is then placed in the processing tank in the usual manner.

Because of the slight upward offset of the tabs 32 and the similar downward offset of the tabs 34 and because the film has a concave lower surface opposed to the flat surface 22 of the bottom of the tool and a convex upper surface which is less convex than the upper portion of the tube it will be seen that the film is handled by the tool entirely by its edges during the inserting operation. It is apparent, therefore, that the entire process of loading the film into the spool does not at any time bring any apparatus into contact with either face of the film excepting for the small portion of the film at the edges which is beyond the light exposed area.

Preferably the material of which the guide is fabricated should be stiff enough so that the tabs 34 and 32 will not inadvertently be sprung out of the grooves 16, but some flexibility is advisable so as to prevent the ribs 18 from being chipped or broken if the outward end of the tool is accidentally swung too far away from a plane tangential to the grooves 16. If desired, this flexibility can be achieved by reducing the width of the extensions 28 and 30 as shown at 36.

The loading operation is seen to be simply one of pushing the film into the funnel like opening with one finger held beyond the tabs 34 and 32 until the film projects slightly and touches the finger. The tabs are then inserted in the groove and the reel spun to cause these tabs to move to the center. The film is then held while the reel is turned backwardly for a revolution or so after which the reel is rotated to spin the tool to the outside. These operations are all of an extremely simple nature and well adapted to be performed in total darkness by a person who does not need to be skilled in the operation of the device.

The loading operation described above is based upon the use of a conventional spool of a type now widely in use. There are some spools, however, in which the flanges can be pulled apart and squeezed together. In loading such a spool with the device of the present invention an alternative procedure may be employed. Instead of starting the tabs of the tool at the peripheral end of the groove and then running these tabs into the center by turning the spool, it is possible to pull the spool flanges apart slightly so that the tabs may be inserted directly into the film groove at the center of the spool, after which the spool flanges are squeezed together to embrace the tabs. The tool is then backed outwardly in the previously described manner to lay the film in the groove.

Although the invention has been described largely in connection with processing 35 mm. films, it is equally adapted to the processing of strip film of other sizes, the specific size chosen being intended merely to serve as a concrete example.

Although I have illustrated and described one form of my invention it will be appreciated that the invention may be embodied in alternative forms. The scope of the invention therefore is to be measured by the appended claims.

Having described my invention, what I claim as new and useful and desire to secure by Letters Patent of the United States is:

1. A photographic film loading guide for loading film upon a film processing spool of the type having inwardly facing spiral grooves extending from its periphery to a point adjacent its axial center, comprising a tubular member having a substantially flat bottom and a convex top portion with the transverse internal dimension between the edges of the flat portion being somewhat less than the width of a film strip to be guided, said tubular portion terminating in upper and lower extensions to provide upper and lower tabs having a width such as to be embraced and guided by the spiral grooves of the spool as the tabs move outwardly from the axial center of the spool, the film to be loaded extending and passing through said tubular member and between said extensions and said tabs.

2. A film loading device for loading photographic strip film upon a processing spool of the type having inwardly facing spiral grooves extending from its periphery to a point adjacent its axial center, comprising means forming upper and lower sets of tabs which together are adapted to fit the grooves in the spool so as to form a film passing space between the tabs of each set, and means carrying said tabs and forming a film embracing member adapted to hold a film strip to be loaded by its edges and having a width such as to cause transverse compression of the film, said film embracing member forming a handle by means of which the device is manipulated.

3. A film loading device for loading photographic strip film upon a processing spool of the type having inwardly facing spiral grooves extending from its periphery to a point adjacent its axial center, comprising means forming upper and lower sets of tabs which together are adapted to fit the grooves in the spool so as to form a film passing space between the tabs of each set, and means attached to said tabs forming a film embracing member adapted to hold a film strip to be loaded by its edges and having a width such as to cause transverse compression of the film, said film embracing member being so orientated relative to said film passing space as to cause film passing through said embracing member to be guided therethrough, and said film embracing member forming a handle by means of which the device is manipulated.

4. A photographic film loading guide for loading film upon a film processing spool of the type having inwardly facing spiral grooves extending from its periphery to a point adjacent its axial center, comprising a tubular member having substantially a flat bottom and a convex top portion with the transverse internal dimension between the edges of the flat portion being somewhat less than the width of a film strip to be guided, said tubular portion terminating in upper and lower extensions to provide a film passing space, said extensions having a width at their outer ends such as to be embraced and guided by the spiral grooves of the spool and having a narrower transverse dimension between said outer ends and said tubular portion so as to pass freely between the sides of the spool.

5. A film loading guide for manually loading photographic strip film into a processing spool of the type having inwardly facing spiral grooves extending from its outer periphery to a point adjacent its axial center, comprising a tubular handle member having a substantially flat bottom and a convex top portion with the transverse internal dimension between the edges of the flat bottom being somewhat less than the width of a film strip to be guided so that the film held within said tubular member is convexly curved, forwardly projecting converging extensions connected to said tubular member and between which the film to be guided is passed and terminating in facing upper and lower tabs, said tabs having a width such as to be embraced and guided in the spiral grooves of the spool, whereby one end of the strip film is held by said tubular member as the device is guided inwardly along the spiral grooves to their inner ends and the strip film is paid out through said member and between said extensions and said tabs into the spiral grooves as the device is moved outwardly along the spiral grooves.

JOHN L. BREARTON.

REFERENCES CITED

The following references are of record in the file of this patent:

UNITED STATES PATENTS

| Number | Name | Date |
|---|---|---|
| 1,188,217 | Stehle | June 20, 1916 |
| 2,297,525 | Anheuser | Sept. 29, 1942 |
| 2,325,823 | Wilson | Aug. 3, 1943 |
| 2,371,073 | Smith | Mar. 6, 1945 |